Jan. 27, 1953  J. E. SEEDERER ET AL  2,626,796
PRECISION BALANCE
Filed Feb. 10, 1948

INVENTORS
JACOB E. SEEDERER
IRVING FEUER
BY
D. Malcolm
ATTORNEY

Patented Jan. 27, 1953

2,626,796

UNITED STATES PATENT OFFICE 2,626,796

PRECISION BALANCE

Jacob E. Seederer, Englewood, N. J., and Irving Feuer, New York, N. Y., assignors to Seederer-Kohlbusch, Inc., Englewood, N. J., a corporation of New Jersey Application February 10, 1948, Serial No. 7,336

1 Claim. (Cl. 265—54)

This invention relates to precision balances such as are employed for weighing objects of very small mass, and it has for its object to increase the sensitivity and stability of such balances under various load conditions.

Another object of the invention is to construct a balance of the above type having a pivoted beam which is stable at its zero point and has high sensitivity and stability under all loads, both heavy and light, within the capacity of the balance.

Another object is to provide a balance of the type specified which assumes a smaller total percentage of added weight than other balances when a load is placed on the weighing pans.

Still another object is to provide a novel and improved precision balance which has a substantially constant strain on the center knife edge throughout the weighing operations, which has a minimum strain on the extremities of the beam, and which is minimally affected by air or temperature convection currents.

Various other objects and advantages will be apparent as the nature of the invention is more fully disclosed.

The operation of analytical balances, such as micro-chemical balances which may be sensitive to one one-thousandths of a milligram, is a task which consumes much time and energy not only because the parts are delicately balanced and require various careful adjustments with each weighing operation, but also because the load sensitivity of the balance varies considerably according to the load which is placed in the weighing pans and this has to be taken into account and compensated by referring to previously computed sensitivity-load charts or curves during each weighing operation.

After considerable experimentation we have now discovered that by weighting the central pivot portion of a balance beam in a manner hereinafter described, the balance will have a minimum change of load sensitivity with a corresponding increase of load. By properly weighting the center (knife edge) of any given balance beam we provide what we call a "heavy centered" balance in which the sensitivity and stability approach or attain a constant value for all loads which the balance is intended to weigh.

Although the novel features which are characteristic of this invention are set forth more in detail in the claim appended hereto, the nature and scope of the invention may be better understood by referring to the following description, taken in connection with the accompanying drawing forming a part thereof, in which a specific embodiment has been set forth for purposes of illustration.

Figure 1:
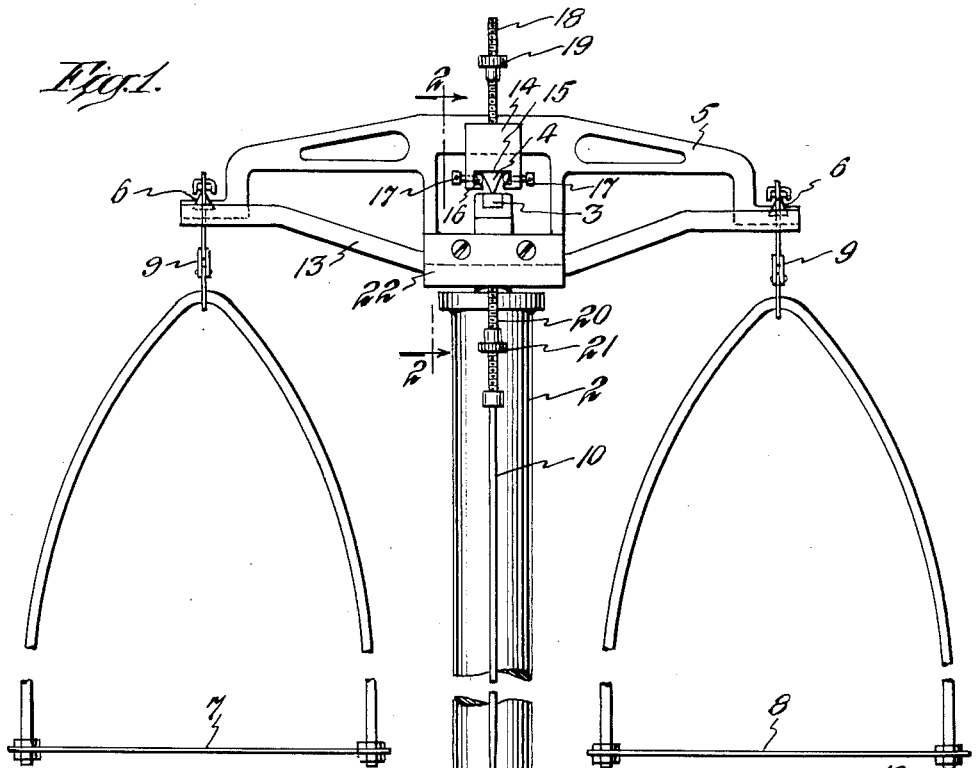
Fig. 1 is a front elevation of a precision balance embodying the invention, with the usual casing omitted in order to simplify the showing.

The balance illustrated in Fig. 1 has a base 1 supporting a casing (not shown) which encloses the entire mechanism and is provided with transparent windows and sliding front in accordance with the usual practice in balances of this type.

The base 1 supports a standard 2 having a knife edge bearing 3 supporting the knife edge 4 which is mounted centrally in the beam 5 as hereinafter more fully described.

The beam 5 carries knife edges 6 at its ends on which are hung the scale pans 7 and 8, the bows of said scale pans usually being hung on the lower hooked ends of yoke frames 9. Also attached to the beam 5 is the usual pointer or indicator 10 cooperating with the graduated scale 12 on the base 1.

The standard 2 also carries the usual vertically movable cradle 13 which is adapted to support the beam and yoke frames so as to avoid damaging the knife edges when the balance is not in use.

In accordance with the present invention, the beam 5 is heavily weighted at the center by means of a weight 14 of metal or other suitable material which, in the embodiment illustrated, is bifurcated and straddles the upper flat bar of the beam 5 and is secured thereto as by welding or other permanent or detachable fastening means.

Figure 3:
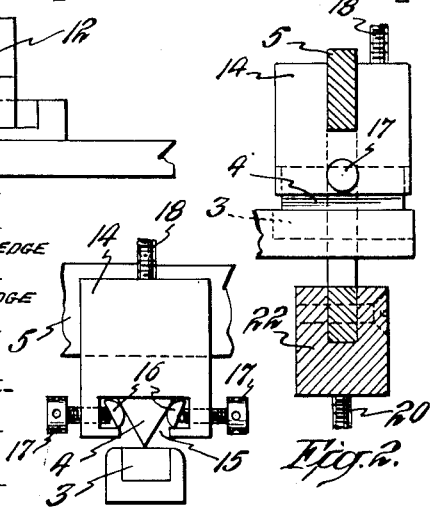
Fig. 3 is an enlarged front view of the weighted central knife edge portion of the balance beam.
Figure 2:
Fig. 2 is an enlarged transverse section taken on line 2—2 of Fig. 1.

The weight 14 is positioned in the center of beam 5, so that the beam maintains its equilibrium and is precisely balanced when the knife edge 4 rests on its bearing 3, as illustrated in Fig. 1. Any slight inequality in the centering of weight 14 is compensated by adjusting the knife edge 4 with respect to said weight. As illustrated in Figs. 1 and 3, the knife edge 4 is seated in a slot 15 in the bottom of weight 14 and is securely clamped therein by shims 16 having rounded faces which engage the sloping sides of the triangular knife edge 4, and flat faces which are engaged by the inner ends of adjustable screws 17. By adjusting the two screws 17, the position of knife edge 4 may be adjusted so that the beam 5 will exactly balance when the knife edge 4 rests on its bearing 3 with no load in either of the pans 7 or 8.

An upper sensitivity changer, comprising a short threaded rod 18 having an adjustable nut 19, may be secured to the top of weight 14; and a lower sensitivity changer, comprising a similar threaded rod 20 and adjustable nut 21, may be secured to the lower bridge 22 of beam 5; these rods 18 and 20 being positioned so that they are aligned in the same vertical plane transversely of beam 5 when the beam is exactly balanced on its knife edge 4.

Now, in order to understand the purpose and operation of our "heavy centered" balance, let it be assumed arbitrarily that the balance shown in Fig. 1 is a microchemical balance constructed to weigh anything up to 50 micrograms, and let it be further assumed that our center weight 14 and sensitivity changers 18—19 and 20—21 are omitted from the balance as in a standard prior art precision balance. In such case it is obvious that when the pans 7 and 8 are empty, the beam 5 will exactly balance and the pointer 10 will assume the central or "zero" position shown in Fig. 1. Furthermore, in such case, if an object of unknown weight in one pan is exactly balanced by a known weight of, say, one-half microgram deposited in the other pan, the pointer 10 assuming the central or "zero" position, the operator will know that the test object weighs one-half microgram.

Again, in the hypothetical case referred to above, if the unknown test object in one pan is slightly heavier than the known one-half microgram weight deposited in the other pan, and tilts the beam so that pointer 10 registers with the first calibration adjacent the "zero" position, this may correctly indicate that the unknown object weighs, say, one-half microgram more than the known weight or a total of one microgram. However, as the weights deposited in the pans 7 and 8 increase, the sensitivity of the balance will ordinarily decrease, and the position assumed by pointer 10 will vary according to the total weights on the pans and not solely according to the difference between the known and unknown weights in the respective pans. This condition in a conventional balance (with no load on the center knife edge) is illustrated graphically by the curve C in the chart of Fig. 4, in which the total loads on the pans are plotted against arbitrary units representing the percent sensitivity of the balance in micrograms. The curve C indicates that in such a conventional balance the sensitivity decreases non-linearly as the total load on the pans is increased. Therefore the operator, when using the hypothetical conventional balance here referred to, must refer to a chart containing the previously plotted curve C and compensate for changes in sensitivity of the balance at various loads, in order accurately to compute the weight of object which is being sought.

Figure 4:
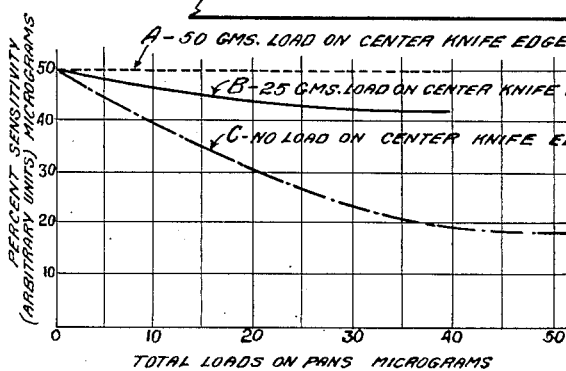
Fig. 4 is a chart employed in graphically illustrating the invention.

We discovered, as a result of our experiments, that a heavy centered balance (a balance with a heavy center and which is relatively light on both sides of said heavy center) has a minimum change of load sensitivity with a corresponding increase of load on the pans. We plotted normal sensitivity/load curves which revealed the normal decrease in sensitivity with increasing loads, and they also demonstrated that opposite cases exist in some balances. The variation in sensitivity is not linear, but, as indicated by the curve B in Fig. 4, the decrease in sensitivity approaches a constant value as the load on the center knife edge is increased, the said curve B representing an added weight of 25 grams on the center knife edge of the hypothetical balance discussed above. We therefore load down the center of the beam until the aforesaid constant value is approached or reached, enabling us in the case of any given balance, to operate in the region of minimum change with load increase. The curve A in Fig. 4 represents our balance having an added weight of 50 grams on the center knife edge, and it will be noted that in the case of this balance there is no variation in sensitivity anywhere within the normal operating range.

The precise value of the center weight 14 on the beam 5 will vary according to the construction, size and capacity of the balance in which it is used, and must be computed for any given type of balance. The sensitivity changers 18—19 and 20—21 are not required in all balances constructed according to our invention, but may be employed when desired to increase or decrease the sensitivity by adjusting the nuts 19 and 21 on the respective threaded rods 18 and 20.

It will also be evident from the foregoing description that, since the weight on our center knife edge 4 is considerably greater than in a conventional balance, and is changed very little by the relatively small weights deposited in the pans 7 and 8, the strain on the knife edge 4 is substantially constant throughout the weighing operation; that there will furthermore be a minimum strain on the light outer extremities of the beam 5; and that, due to the overall increased mass of the beam, the balance will be minimally affected by air or temperature convection currents; all of which are important factors in reducing distortion and increasing the accuracy of the balance.

Although a specific embodiment has been shown and described herein for purposes of illustration, it will be evident to those skilled in the art that the invention is capable of various other modifications and adaptations within the scope of the appended claim.

The invention claimed is:

A precision balance comprising a support containing a knife edge bearing, a beam which is relatively light on both sides of its center, a relatively heavy weight containing a slot on the center of said beam, a knife edge of triangular cross-section seated in said slot and pivoted on said bearing, retaining members in said slot engaging the sloping sides of said knife edge, and adjustable means engaging said retaining members for adjusting said knife edge with respect to said center weight, said center weight being heavy enough to give said beam substantially uniform sensitivity under various load conditions.

JACOB E. SEEDERER.
IRVING FEUER.

REFERENCES CITED

The following references are of record in the file of this patent:

UNITED STATES PATENTS

| Number | Name | Date |
|---|---|---|
| 568,582 | Richards | Sept. 29, 1896 |
| 1,065,844 | Sartorius | June 24, 1913 |
| 1,354,275 | Bachman | Sept. 28, 1920 |
| 1,859,604 | Sachse | May 24, 1932 |
| 2,191,635 | Battenberg | Feb. 27, 1940 |